United States Patent [19]
Miyashita et al.

[11] 3,746,503
[45] July 17, 1973

[54] METHOD AND APPARATUS FOR HEATING COMBUSTIBLE GAS

[75] Inventors: Tsuneo Miyashita; Tsutomu Fukushima, both of Kawasaki, Japan

[73] Assignee: Nippon Kokan Kabushiki Kaisha, Kawasaki-shi, Kanagawa-ken, Japan

[22] Filed: Dec. 16, 1971

[21] Appl. No.: 208,674

[30]   Foreign Application Priority Data
   Dec. 22, 1970   Japan............................. 45/115371

[52] U.S. Cl. ................................................. 432/30
[51] Int. Cl. .............................................. F23l 9/04
[58] Field of Search .......................... 263/19 R, 52; 432/29, 30, 54, 214

[56]       References Cited
       UNITED STATES PATENTS
3,082,995   3/1963   Krapf................................... 263/19

*Primary Examiner*—John J. Camby
*Attorney*—Robert D. Flynn, Leonard Holtz et al.

[57]       ABSTRACT

This invention relates to a regenerator heat exchanger with means for changing over a heat accumulating stage to a heat exchanging stage and vice versa. The invention is also concerned with a method of using such heat exchanger.

11 Claims, 1 Drawing Figure

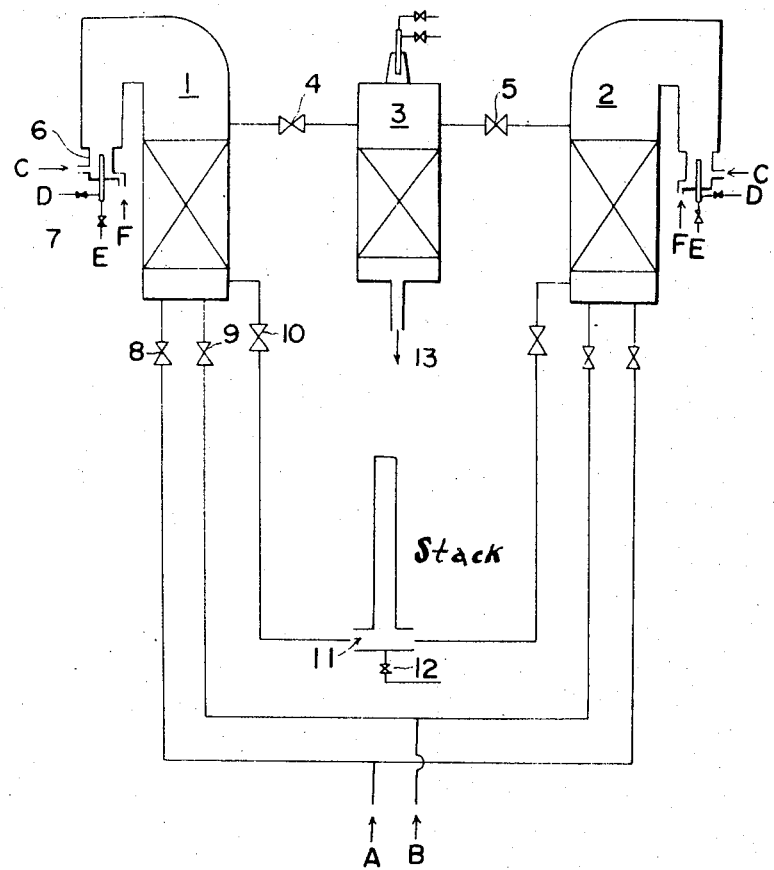

METHOD AND APPARATUS FOR HEATING COMBUSTIBLE GAS

The present invention relates to an apparatus and a method for changing over a heat accumulating stage to a heat exchanging stage and vice versa in a heat exchanger without substitution of the atmosphere therein by inert gas or steam in heating such combustible or explosive gases as methane and propane, or coke-oven gas, by means of a regenerator type heat exchanger.

BACKGROUND OF THE ART

In a direct reduction process by using gaseous reducing agents (CO, $H_2$), various methods have been known in the prior art to heat such reducible or combustible gases as CO, $H_2$ or hydrocarbonaceous gas, e.g. methane, up to a high temperature, e.g. 1,000°C.

These known methods are roughly classified into the following two categories according to the types of heat exchangers used. One is a method of heating by means of recuperator type heat exchangers or directly by electricity wherein continuous heating of gas is possible. The electric heating system of the Wiberg process is well known in this kind of method. The other is a method of heating by regenerator type heat exchangers. In this type of heat exchangers, a cycle comprising a heat accumulating stage and a heat exchanging stage is repeated. This method is adopted in many processes such as the Purofer process and the Koppers process.

In order to reduce the quantity of coke consumed by blowing a reducing gas heated up to a high temperature into the lower part of the shaft of a blast furnace, it is advantageous for the thermal efficiency to blow the gas at the highest possible temperature within such a range so as not to soften the portion of charged materials into which the gas is blown, e.g. 1,200° – 1,250°C. When heated $CO_2$ is made to react with heated hydrocarbonaceous gas, an endothermic reaction takes place and CO and $H_2$ are obtained. Therefore, in order to obtain a reducing gas containing CO and $H_2$ having as high a temperature as possible, $CO_2$ and hydrocarbonaceous gases must preferably be heated up to as high a temperature as possible to supplement the reaction heat. Preferably such gases should be heated up to more than 1,200°C.

The quantity of coke to be consumed should be decreased, in order to decrease the manufacturing cost, by blowing reducing gases having a high temperature into the lower part of the shaft of the blast furnace. In order to attain this object, energy sources and reducing agents which are available at a lower price than that of coke are required. At present electric energy is not preferred because it is more expensive than coke.

In view of the foregoing, the conventional recuperator type heat exchangers are disadvantageous for heating gases up to such a high temperature as above 900°C. further, it is well known to those skilled in the art that in this type of heat exchanger the heat exchange is inefficient. Heating by means of electric power such as Wiberg method is not preferred from the economical point of view. For the foregoing reasons, in order to obtain gases having such a high temperature as above 1,000°C regenerator type heat exchangers are generally used.

In the regenerator type heat exchangers, it is necessary to provide two heat exchangers, in which a heat accumulating stage and a heating exchanging stage must be switched over to each other alternately.

There is no danger in switching over a heating exchanging stage to a heat accumulating stage in an oxidized atmosphere such as in an ordinary hot blast. On the other hand, it is very dangerous to heat reducible or combustible gases because there is a possibility that such gases may explode at the time of switchover of the stages.

In the prior art in order to prevent such explosion, the gas filled in a heating chamber was substituted with inert gases such as $N_2$, Ar, steam, etc. at the time of switchover of the stages. Such a substitution with inert gases required several times the volume of the heating chamber of inert gases, resulting in high cost for such inert gases and a large amount of heat loss.

In the conventional furnaces which were developed for a direct reduction process, gases have been generally blown thereto at a temperature of less than 1,000°C to prevent adhesion of iron ores, so that the above-mentioned stage-switching type heat exchangers might be used. However, if gases having such a high temperature as 1,200° – 1,300°C are to be obtained as in the present invention, heat loss caused at the time of switchover of the stages in such a type of heat exchangers cannot be disregarded.

Thus, what is required in such a heating is a furnace for heating reducible gases, in which switchover of a heat accumulating stage to a heat exchanging stage and vice versa is possible without substitution with inert gases, etc. and which facilitates the prevention of a fall in temperature in a heating chamber at the switchover of the stages. The present invention provides a method of heating combustible gases and a regenerator type heat exchanger therefor.

SUMMARY OF THE INVENTION

One aspect of the present invention is concerned with a regenerator type heat exchanger system comprising a regenerator-heat exchanger, burner means connected to said regenerator-heat exchanger, means for producing an oxidizing flame at said burner means, means for producing a reducing flame at said burner means and means for controlling the operation of said burner means to produce said oxidizing flame or said reducing flame.

Another aspect of the present invention is concerned with a method of heating combustible or reducible gas by means of a regenerator type heat exchanger, comprising regenerating the heat exchanger by heating with an oxidizing gas, produced by an oxidizing flame, terminating the heating with the oxidizing gas, reducing the oxygen content within the heat exchanger with a reducing gas produced by a reducing flame and thereafter passing gas to be heated through the heat exchanger.

BRIEF DESCRIPTION OF THE DRAWINGS

The present invention will now be described in more detail, reference being made to the accompanying drawing in which a process and apparatus for heating combustible gases is shown diagrammatically.

DESCRIPTION OF PREFERRED EMBODIMENTS

The drawing shows an embodiment of a process in which coke-oven gas A and blast furnace waste gas B are heated in a heat exchanger 1 or 2 and led to a reforming tower 3 where said gases A and B are reformed. These gases are then blown into the shaft 13 of a blast furnace. In the present invention an improved amount of heating burners 6 and 7 of the heat exchanger 1 or 2 is provided. This facilitates switching over a heat accumulating stage to a heat exchanging stage by changing combustion with an oxidizing flame into combustion with a reducing flame without causing explosion. The embodiment shown in the drawing comprises a combination of burners comprised of a main burner 6 which is particularly adapted for combustion with an oxidizing flame in the heat accumulating stage and a special auxiliary burner 7 which is available for both combustion with an oxidizing flame and then with a reducing flame, such combustions being interchangeably switched over to each other. However, the main burner itself may be such as simultaneously to serve as the auxiliary burner, which is available both for combustion with an oxidizing flame and then with a reducing flame.

With this combination of the burners of the present invention, in a reforming stage reforming is conducted by combustion with the oxidizing flame by means of the invention, in a heat accumulating stage reforming is conducted by combustion with the oxidizing flame by means of the main burner, with an exhaust valve 4 for reducible gases and inlet valves 8, 9 for blast furnace gases and coke-oven gases closed respectively and a stack valve 10 which is opened. At the end of the heat accumulating stage the auxiliary burner 7 is ignited, while the main burner 6 is turned off during combustion with the oxidizing flame. Then the flame of the auxiliary burner 7 is switched over to a reducing flame. When the concentration of oxygen in the heat exchanger becomes less than the upper limit, above which limit there is a possibility that an explosion will occur, the stack valve 10 is closed and the other valves 4, 8, 9 are opened. Thus a conversion from the heat accumulating stage to the heat exchanging stage of reducible gas takes place and then the auxiliary burner is turned off.

In switching over the heat exchanging stage to the heat accumulating stage, the valves 4, 8, 9 are closed and the stack valve 10 is opened. The auxiliary burner 7 is ignited. The combustion flame thereof is changed from a reducing flame to an oxidizing one. When the atmosphere in the heat exchanger becomes oxidized, the main burner 6 is ignited and the auxiliary burner 7 is turned off. Thus the heat exchanging stage is switched over to the heat accumulating stage. In this switchover of the stages, if there is a possibility that explosion may occur in the stack 11 when the stack valve 10 is opened, the stack 11 may be purged by passing steam 12 therethrough. This does not interfere with the heat exchanging operation. In the drawing, reference letters C denotes air, D oxygen, E heavy oil and F fuel respectively.

As has been described hereinbefore, the present invention provides as a combustion burner for a regenerator type heat exchanger a burner in which it is possible to arbitrarily switch over oxidizing combustion to reducing combustion and vice versa, or in that a specific auxiliary burner in which it is possible to arbitrarily switch-over oxidizing combustion to reducing combustion and vice versa is provided in addition to said combustion burner. It is possible to control and heat the atmosphere is the heat exchanger by combustion waste gas of said auxiliary burner.

In such a way, the heat accumulating stage at which combustion with oxidizing flame is conducted is switched over to the heat exchanging stage by converting the combustion atmosphere of the auxiliary burner to the reducing atmosphere. Substitution of the atmosphere in the heating chamber by inert gas, steam, etc. is not required. As a result there is a decrease in the temperature drop and heat loss and a non-occurrence of explosions caused by insufficient substituion of the atmosphere in the heating chamber. It can be applied not only to heating the reducible gases blown into a blast furnace but also to heating the gaseous reducing agents used in various kinds of direct reduction processes. It is possible to arbitrarily control the atmosphere in the heating chamber through the burner means provided in a regenerator type heat exchanger and which is available both for oxidizing flames and reducing flames, said flames being switched over from each other. Further, this method of controlling the atmosphere in a heating chamber by waste gas from a burner or of substituting the atmosphere can be applied to substitution of any explosive gas. For example, the substitution of gas generated in the cracking of oil by steam or of the atmosphere in a furnace for generating water gas or tubes for this furnace.

What we claim is:

1. A regenerator type heat exchanger system comprising a regenerator-heat-exchanger, means for introducing gas to be heated to said heat exchanger, burner means connected to said regenerator-heat-exchanger, means for producing an oxidizing flame at said burner means, control means for selectively terminating the oxidizing flame at said burner means, and means for producing a reducing flame at said burner means for reducing the oxygen content within the heat exchanger, said control means for terminating the oxidizing flame including means for controlling the operation of said burner means to selectively produce said oxidizing flame in the heat accumulation state or said reducing flame in the heat exchanging state of said system.

2. A regenerator type heat exchanger system comprising a regenerator-heat-exchanger, a first inlet conduit connected to said regenerator-heat-exchanger, first valve means in said inlet conduit for controlling the flow of a gas to be heated to said regenerator-heat-exchanger, burner means connected to said regenerator-heat-exchanger, means for producing an oxidizing flame at said burner means, means for producing a reducing flame at said burner means, an exhaust conduit connected to said regenerator-heat-exchanger, second valve means for controlling the flow of gases from said regenerator-heat-exchanger through said exhaust conduit, an outlet conduit connected to said regenerator-heat-exchanger, third valve means in said outlet conduit for controlling the passage of gas from the regenerator-heat-exchanger to a point of consumption and means for controlling the operation of said burner means to produce said oxidizing flame or said reducing flame.

3. A regenerator type heat exchanger system as claimed in claim 2, comprising a main burner for producing an oxidizing flame and an auxiliary burner for producing an oxidizing flame or a reducing flame.

4. A regenerator type heat exchanger system as claimed in claim 2 comprising a regenerator, said regenerator being connected to said outlet conduit for receiving heated gases from said regenerator-heat-exchanger.

5. A regenerator type heat exchanger system as claimed in claim 2, comprising a fourth inlet conduit and second valve means in said second inlet conduit for controlling the flow of a gas into said regenerator-heat-exchanger.

6. A regenerator type heat exchanger system as claimed in claim 5, comprising means for feeding coke-oven gas to said first inlet conduit and means for feeding blast furnace waste gas to said second inlet conduit.

7. A method for heating combustible or reducible gas by means of a regenerator type heat exchanger, comprising regenerating the heat exchanger by heating with an oxidizing gas produced by an oxidizing flame, terminating the heating with the oxidizing gas, reducing the oxygen content within the heat exchanger with a reducing gas produced by a reducing flame and thereafter passing gas to be heated through the heat exchanger.

8. A method as claimed in claim 7 comprising terminating the introduction of gas to be heated when the temperature of the heat exchanger has fallen to a point where the heat exchanger must be heated.

9. A method as claimed in claim 8 comprising reducing the reducing gas in the heat exchanger with an oxidizing gas while changing the burner from a reducing flame to an oxidizing flame, and thereafter passing the oxidizing gas through the heat exchanger for the purpose of heat accumulation.

10. A regenerator type heat exchanger system as claimed in claim 1 wherein said means for introducing gas to be heated includes means for terminating the introduction of said gas to be heated when the temperature of the heat exchanger has fallen to a point where the heat exchanger must be heated.

11. A regenerator type heat exchanger system as claimed in claim 10 wherein said control means causes reduction of the reducing gas in the heat exchanger with an oxidizing gas while changing the burner from a reducing flame to an oxidizing flame, and thereafter causing the oxidizing gas to be passed through the heat exchanger for the purpose of heat accumulation.

* * * * *

UNITED STATES PATENT OFFICE
CERTIFICATE OF CORRECTION

Patent No. 3,746,503       Dated July 17, 1973

Inventor(s) Tsuneo MIYASHITA et al

It is certified that error appears in the above-identified patent and that said Letters Patent are hereby corrected as shown below:

Column 5, lines 7 and 8, after "comprising" delete "a fourth inlet conduit and second" and insert --a second inlet conduit and fourth--.

Signed and sealed this 18th day of December 1973.

(SEAL)
Attest:

EDWARD M. FLETCHER, JR.
Attesting Officer

RENE D. TEGTMEYER
Acting Commissioner of Patents